(12) United States Patent
Martín Gómez et al.

(10) Patent No.: US 12,415,614 B2
(45) Date of Patent: Sep. 16, 2025

(54) AIR TO AIR ACTIVE REFUELING SYSTEM AND METHOD FOR GENERATING AERODYNAMIC RADIAL LOADS AT A HOSE-END

(71) Applicant: AIRBUS DEFENCE AND SPACE S.A.U., Madrid (ES)

(72) Inventors: Gonzalo Martín Gómez, Madrid (ES); Samuel De La Fuente López, Madrid (ES)

(73) Assignee: AIRBUS DEFENCE AND SPACE S.A.U., Madrid (ES)

( * ) Notice: Subject to any disclaimer, the term of this patent is extended or adjusted under 35 U.S.C. 154(b) by 192 days.

(21) Appl. No.: 18/129,699

(22) Filed: Mar. 31, 2023

(65) Prior Publication Data
US 2023/0242270 A1  Aug. 3, 2023

Related U.S. Application Data

(62) Division of application No. 17/512,250, filed on Oct. 27, 2021, now Pat. No. 11,866,191.

(30) Foreign Application Priority Data

Oct. 29, 2020 (EP) .................................... 20382943

(51) Int. Cl.
 *B64D 39/02* (2006.01)
 *B64D 39/06* (2006.01)
(52) U.S. Cl.
 CPC ............. *B64D 39/02* (2013.01); *B64D 39/06* (2013.01)

(58) Field of Classification Search
 CPC ........ B64D 39/00; B64D 39/02; B64D 39/04; B64D 39/06; F24B 10/143
 See application file for complete search history.

(56) References Cited

U.S. PATENT DOCUMENTS

| | | | |
|---|---|---|---|
| 4,659,036 A | 4/1987 | Pinson | |
| 10,329,016 B1 | 6/2019 | Jackson et al. | |

(Continued)

FOREIGN PATENT DOCUMENTS

| | | |
|---|---|---|
| CN | 108883826 | 11/2018 |
| CN | 109631685 | 4/2019 |

(Continued)

OTHER PUBLICATIONS

Translation of FR 2569652 A1, Mar. 7, 1986 (Year: 1986).*

*Primary Examiner* — Joshua J Michener
*Assistant Examiner* — Ryan Andrew Yankey
(74) *Attorney, Agent, or Firm* — Nixon & Vanderhye P.C.

(57) ABSTRACT

A method for compensating for aerodynamic radial loads applied to a drogue coupling of a hose and drogue air to air active refueling system including: deploying a refueling hose from a tanker aircraft, wherein the drogue coupling is at a distal end of the hose and the drogue coupling is connected to a hose end control unit which includes at least three fins extending outward into air flowing over the hose end control unit; sensing acceleration of the hose end control unit and/or the drogue coupling, generating an acceleration signal with data representing the sensed acceleration; determining at least one deflection angle for at least one of the three fins based on the acceleration signal, and rotating at least one of the three fins by the at least one deflection angle.

17 Claims, 6 Drawing Sheets

(56) References Cited

U.S. PATENT DOCUMENTS

| | | |
|---|---|---|
| 2003/0173459 A1 | 9/2003 | Fanucci et al. |
| 2007/0084968 A1 | 4/2007 | Thal et al. |
| 2011/0001011 A1* | 1/2011 | Degiorgis ............... B64D 39/00 244/135 A |
| 2013/0168497 A1 | 7/2013 | Rix |
| 2014/0306063 A1 | 10/2014 | Kusnitz |

FOREIGN PATENT DOCUMENTS

| | | |
|---|---|---|
| EP | 0 747 659 | 12/1996 |
| EP | 2 266 879 | 12/2010 |
| FR | 2569652 A1 * | 3/1986 |
| GB | 2 405 384 | 3/2005 |
| GB | 2 418 186 | 3/2006 |

* cited by examiner

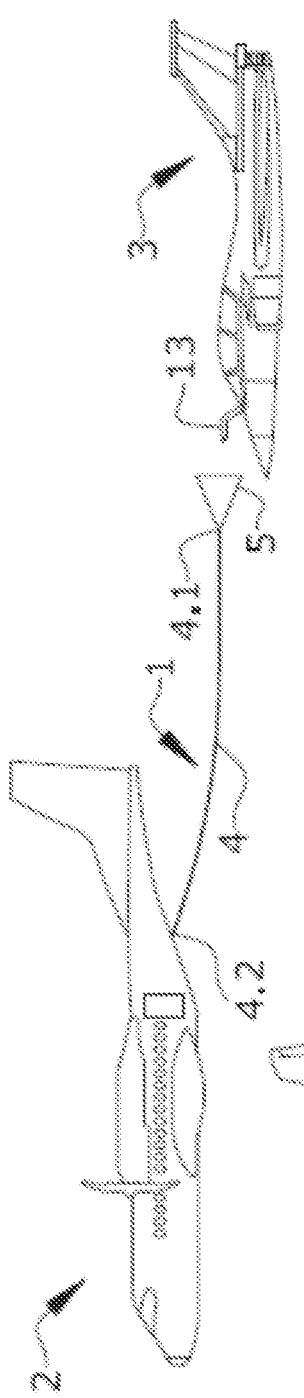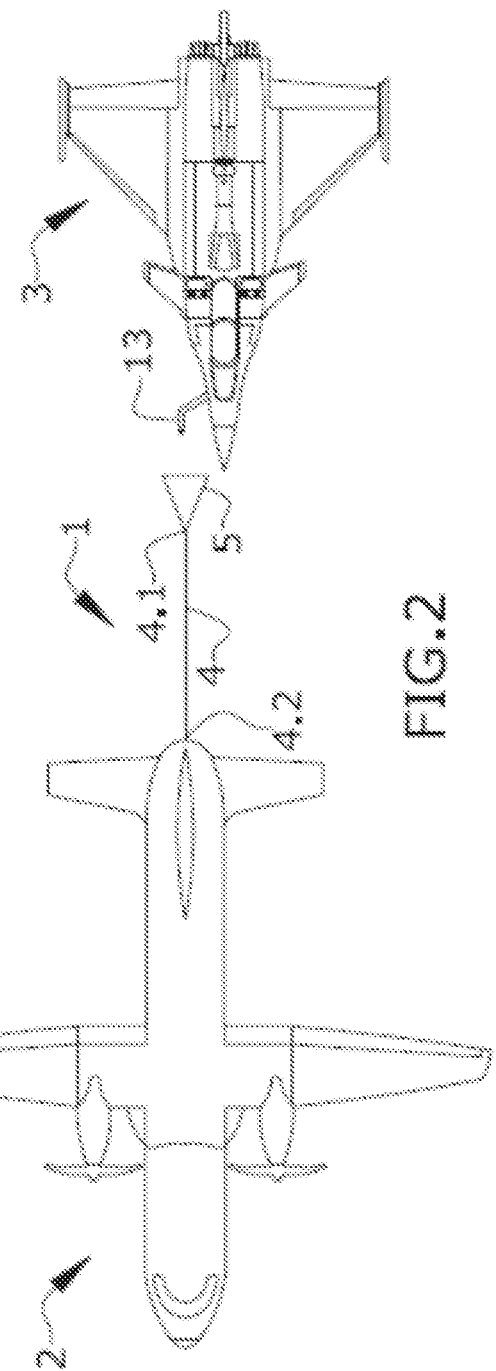
FIG.1
FIG.2

AIR TO AIR ACTIVE REFUELING SYSTEM AND METHOD FOR GENERATING AERODYNAMIC RADIAL LOADS AT A HOSE-END

RELATED APPLICATION

This application is a divisional of U.S. patent application Ser. No. 17/512,250, filed Oct. 27, 2021, which claims priority to and incorporates by reference European Patent Application EP 20382943.7, filed Oct. 29, 2020.

TECHNICAL FIELD

The present invention belongs to the field of air to air refueling for aircraft. In particular, the invention relates to systems for monitoring and adapting movement at the end of an air to air refueling hose in a hose and drogue refueling system.

BACKGROUND OF THE INVENTION

Conventional air to air refueling is a well-known maneuver where a tanker aircraft operates to provide in-flight fuel to a receiver aircraft. One of the most used conventional air-to-air refueling systems is a hose and drogue system. The hose and drogue system deploys the hose and drogue from the tanker aircraft and relies on the skills of receiver aircraft pilot to engage the drogue. There is a high ratio of unsuccessful contacts between the receiver aircraft and the drogue. The failed contacts can have operational and/or safety consequences. An unsuccessful approach of the receiver aircraft towards the drogue can result in damage of the receiver aircraft, drogue and tanker aircraft.

In conventional air refueling systems, the hose and drogue are stored in the tanker aircraft. In operation, the tanker aircraft pilot stabilizes the aircraft at an air to air refueling altitude. While the hose and drogue remain stored in the tanker aircraft, the system is turned on and the receiver aircraft waits for instructions from the tanker aircraft to initiate the refueling operation. Next, the hose and drogue are extended from the tanker aircraft until the drogue reaches a stand-by position relative to the tanker aircraft. While the drogue remains in the stand-by position, the receiver aircraft approaches the drogue.

A successful approach of the receiver probe towards and into the drogue depends on the skills of the pilot of the receiver aircraft pilot. The pilot must anticipate the movement of the drogue relative to the receiver probe skills and anticipation to the drogue movements.

The approach of the receiver aircraft creates a bow wave ("Bow Effect") in the atmospheric air that can move the drogue from the stand-by position. The Bow Effect increases the difficulty of engaging a receiver probe with the drogue.

Once the receiver aircraft succeeds in maneuvering the receiver probe into the drogue, the receiver aircraft pushes the receiver probe into the drogue to engagement between the receiver probe and the drogue. As the receiver probe is pushed into the drogue, a Whipping Phenomenon in the hose can occur on the contact area due to an impact between the receiver probe and the drogue. The force of the impact is transmitted to the hose and causes the hose to move in a whipping manner. In view of the Whipping Phenomenon and other possible mishaps that can occur, the pushing of the receiver probe into the drogue is a dangerous maneuver.

Once the receiver probe is fully engaged with the drogue, fuel can be dispensed from the tanker aircraft into the receiver aircraft. While the receiver probe is fully engaged with the drogue, the drogue is submitted to radial loads transmitted by the receiver aircraft. The radial loads create risks of damage to the drogue and receiver probe. Further, there is a risk of premature disconnection between the drogue and receiver probe if the receiver aircraft moves backward relative to the drogue which starts a premature disconnection process. If disconnection occurs prematurely, the receiver aircraft may have to repeat the steps of engaging the receiver probe with the drogue.

As indicated above, conventional air to air refueling methods give rise to risks and uncertainties due to the manual steps of the approach and engagement of the receiver probe to the drogue, the aerodynamics of the interaction between the receiver aircraft and the drogue and the loads at the contact region between the receiver probe and drogue, and tension in the hose while the receiver aircraft engages the drogue.

Active control of the end of the hose is used with the flying boom used by the U.S. Airforce. A flying boom is a relatively rigid and extendible boom having an end with a fuel coupling. The end includes a pair of wings used to fly the end of the boom to engage the fuel coupling with a receptacle of a receiver aircraft. The receiving aircraft remains in a steady position relative to the tanker aircraft as the boom is flow to the receptacle.

In contrast to the flying boom, the drogue in a hose and drogue system remains at a steady state position and the receiver aircraft maneuvers towards the drogue. Thus, the hose and drogue air to air refueling operation involves the drogue being passive as the pilot of the receiver aircraft manually controls the approach and engagement of the receiver prober into the drogue.

Active control of hose and drogue systems have been proposed but none have progressed to a valid in-service solution due to drawbacks. Some of these drawbacks of active control of a hose and drogue system are: difficult integration between the air to air refueling system and the tanker aircraft, low aerodynamic load capability of the system, transmission of torsion loads to the hose of the system, absence of a fixed referenced of the hose-end because of the hose torsion, and ensure the safety of the operation.

SUMMARY OF THE INVENTION

An active control for a hose end, e.g., drogue, in a hose and drogue system has been conceived and is disclosed here. The present invention may be embodied to address aerodynamic issues, e.g., Bow Effect and Whipping Phenomenon, that occur as a receiver aircraft maneuvers a receiver probe towards and into a drogue, and compensate for the loads resulting from the contact between the receiver probe and drogue and tension in the hose during refueling.

The invention may achieve active control by introducing aerodynamic forces applied to the drogue in radial direction. These forces are applied to control the drogue as the receiver probe approaches the drogue and while the drogue couples to the receiver probe. The active control may be applied to reduce the ratio of unsuccessful contacts between a receiver probe and a drogue by, at least partially, automating the approach of a receiver probe into a drogue.

The inventive active control may also be applied to reduce oscillations of the drogue as the receiver probe approaches the drogue and while the drogue engages the receiver probe. Reducing drogue oscillations is believed to reduce the instances of damage to the tanker aircraft and/or the receiver aircraft during air to air refueling and thereby increases the safety of air to air refueling and increases the reliability of air to air refueling operations.

The invention may provide active system for an air to air refueling system that automatically counteracts undesirable movements at an end of the hose by generating aerodynamic loads applied to the end of the hose to counteract the undesired movements.

In a first inventive aspect, the present invention provides an air to air active refueling system for a tanker aircraft, the system comprising: a hose suitable for conveying fuel, a drogue arranged at a hose-end of the hose configured connect to a receiver probe; a hose-end control unit (HCU) at the hose-end, wherein the HCU includes: at least three grid fins each located on a respective fin shaft and configured fold and deploy and to rotate about a respective fin shaft.

The invention may further include a processing unit configured to command an actuator(s) to rotate each of the grid fins by a deflection angle determined based on the acceleration of the HCU and the relative position between the drogue and receiver probe. The HCU may also include an inertial measurement unit (IMU) configured to measure the acceleration of the hose-end; and a first sensor configured to measure the relative position between the HCU or tanker aircraft and the receiver probe of the receiver aircraft. The deflection angles for the grid fins are determined by the processing unit to reduce aerodynamic radial loads at the hose-end.

The present invention may be installed in a tanker aircraft for providing aerodynamic loads to counteract the undesirable movements at the end of the hose in an air to air refueling operation between the tanker aircraft and a receiver aircraft. These undesirable movements at the hose-end are external forces or perturbations that could move the drogue from its equilibrium position in the refueling operation, and particularly in the contact operation. The "contact operation" will be understood as the operation in which the drogue of the present system contacts a receiver probe of a receiver aircraft.

Thus, the present invention may be embodied to provide an improved system with a hose-end with the capability of being controlled to provide automatic drogue stabilization as a receiver aircraft approaches to contact.

The present invention may be embodied an active system given that the configuration of the hose movement in the refueling operation is based on the information provided by the HCU system (not from the receiver aircraft) so that the receiver connection based on receiver pilot skills is facilitated. That is, the present invention may be embodied to provide an active control of the hose facilitating the contact in the refueling operation by means of introducing aerodynamic radial loads at the hose-end in a new way compared with the prior art solution.

The air to air refueling system is mainly formed by means of a hose and a drogue arranged at one end of the hose. The hose comprises two ends, a first end intended to be coupled to a probe of the receiver aircraft by means of the drogue and a second end intended to be fixed to the tanker aircraft. Through this hose a fuel supply is provided from the tanker aircraft to the receiver aircraft, that is, from one hose-end to the other hose-end.

Throughout this document when reference is made to "hose-end", this will be understood as the free end of the hose through which the coupling with the receiver aircraft is performed. In addition, in case the other end of the hose is referred to, it will be referred to as the hose-end that is fixed to the tanker aircraft. The drogue is comprised in a coupling that is located at the hose-end.

The present invention may further comprise a hose-end control unit (HCU) that determines deflection angles to turn the grid fins of the HCU to reduce aerodynamic radial loads at the end of the hose. The HCU is located at the hose-end, in a particular example, between the hose and the coupling, and in another particular example the HCU is located on the coupling. In a particular embodiment, this HCU is configured to be connected to an aircraft control equipment located at the tanker aircraft. In particular, this aircraft control equipment is understood as a controller that is responsible for the operation of the HCU at the hose-end in this particular embodiment.

The present invention may further comprise a processing unit connected to or included with the HCU, that processes the information from the HCU and is able to determine autonomously and in real-time the aerodynamic loads needed to be applied by the grid fins at the hose-end or may and send this information to an aircraft control equipment of the tanker aircraft for determining the aerodynamic loads needed at the hose-end.

The HCU may comprise a plurality of grid fins with a grid configuration which is in charge to generate aerodynamic radial loads at the hose-end. Each grid fin is perforated along its entire length forming a grid configuration and the perforated portion of the fin may be within a frame of the fin. The grid fins are each attached to a frame of the HCU by a respective fin shaft such that the fins can be folded or deployed with respect to the HCU. In a folded state, the grid fins are folded towards, e.g., against, the HCU frame. In a deployed state, the grid fins are deployed outward the HCU frame such as by extending perpendicular from a longitudinal axis of the frame.

The grid fins advantageously are able to be folded in a reduced volume, allowing them to be stored in a tunnel of a rear fairing where the hose and drogue devices (hose, coupling, drogue and HCU) are housed when not in use and the system is installed in a tanker aircraft. That is, the present configuration of grid fins attached to the HCU facilitates the integration of the system in the tanker aircraft.

The grid configuration of the grid fins may provide a reduced hinge movement and has a better integration performance since can be easily folded and deployed. In addition, this grid configuration has higher drag than conventional fins of the state of the art (without a grid configuration). This grid configuration is an advantage in the present system since the drag force is useful for controlling the axial forces at contact operation between the drogue of the tanker aircraft and the receiver aircraft. That is, the shape of the fins and their ability to be folded or deployed allow the system increases its aerodynamic load capability compared to the prior art solution by means of generating the necessary loads to counteract adverse movements at the hose-end.

When the grid fins are in a deployed state, this plurality of grid fins may also be configured to rotate around a longitudinal axis and independently adapt their deflection angle. It will be understood that the grid fins rotate all at once with respect to a longitudinal axis along which the HCU is arranged. In particular, this longitudinal axis will correspond to the longitudinal direction that the hose-end follows where the HCU is located. Therefore, it will be understood that the grid fins can rotates around the hose at the hose-end. Furthermore, the deflection angle is configured independently for each gird fin by rotating each grid fin around its respective fin shaft. Particularly, the grid fins are configured to be actuated by the HCU under any external force to change the deflection angle in each grid fin independently. This change in the deflection angle of a grid fin will be understood as the own rotation of the grid fin on itself.

The HCU may be configured to provide aerodynamic radial loads at the hose-end by means of adjusting the deflection angle of each grid fin appropriately and rotating the plurality of grid fins when these grid fins are in the deployed state. The aerodynamic loads provided by the present system at the hose-end are radial loads given that the plurality of grid fins rotates all together with respect to a rotation axis so that loads acting perpendicular to the rotation axis are generated.

The present invention may be embodied as an improved air to air refueling system given that the HCU has an active control of the radial generated aerodynamic force at the hose-end in order to adapt his hose-end to the external perturbations. These radial forces generated by the HCU are transmitted to the hose, the coupling and the drogue.

The HCU may further comprises an inertial measurement unit (IMU) located at the HCU frame and intended to measure the movement of the hose-end, specifically to measure the acceleration at one point of the hose-end. That is, the IMU measures the acceleration of the HCU in a refueling operation Thus, this IMU advantageously allows the system to monitor in real time, the movement of the HCU in the air to air refueling operation.

The present system further comprises a first sensor configured to measure the relative position between the localization of said first sensing means in the system and the probe of receiver aircraft. That is, the first sensing means are able to detect the relative position between their location and the probe of the receiver aircraft, having complete information about the spatial location of the tanker, the hose-end and the probe of the receiver aircraft.

In a particular embodiment, the first sensor is located on the hose-end of the tanker aircraft and are configured to measure the relative position between the hose-end and the probe of the receiver aircraft. Particularly, the first sensing means are able to detect the relative position of the receiver probe with respect to the drogue arranged on the hose-end. In another particular embodiment, the first sensing means are configured to be located on the tanker aircraft and to measure the relative position between the tanker aircraft and the probe of the receiver. In this embodiment, when the system is in an operative mode installed in the tanker aircraft, the first sensing means are located in this tanker aircraft.

In a more particular embodiment, the first sensor are one or more of: ultrasound sensors, infrared sensors, visible light sensors image processing cameras, a TOF (time-of-flight) camera, e.g. a radar system or a light detection and ranging (LIDAR) sensor.

Both IMU and the first sensor are connected to the processing unit so that the measurements from the IMU and first sensing means are used in a closed control loop in the processing unit to command, by the HCU, the fins to counteract the undesired hose movements. The measurements performed by the IMU and the first sensor may be processed by the processing unit for determining the real time aerodynamic loads present at the hose-end.

Furthermore, the processing unit monitors the status of the HCU thus allowing internal failure detection.

The IMU and first sensor enable the HCU, e.g., processing unit, to have knowledge of the attitude of the HCU during the active mode (refueling operation) to perform an active control of the system, as well as also allows the aircraft control equipment (when the system is connected to the tanker aircraft) to have information from both the IMU and first sensing means.

Based on the IMU and sensor measurements and the conditions of the refueling operations, the system by means of the processing unit determines in an operative mode (when the system is connected to the tanker aircraft) the aerodynamic loads that are necessary to counteract the undesirable movements at the hose-end on order to facilitate the contact operation between the tanker aircraft and the receiver aircraft. Particularly, the processing unit will be understood as a device comprising a controller in charge of control the HCU and send commands to the HCU.

In other embodiment, an aircraft control equipment from the tanker aircraft determines in an operative mode (when the system is connected to the aircraft control equipment in a tanker aircraft) the aerodynamic loads that are necessary to counteract the undesirable movements at the hose-end in order to facilitate the contact operation.

Once the needed aerodynamic loads are determined, the system is configured to command the HCU (either by the processing unit or the aircraft control equipment) to adapt the deflection angle of each grid fin independently and to rotate the plurality of grid fins. The rotation of the plurality of grid fins, already with their deflection angle adapted, provides the desired aerodynamic radial loads at the hose-end.

The present invention may be configured to increase the ratio of successfully contact between a receiver probe and a drogue as compared to the ratio hose and drogue systems that lack active controls. The invention may also assist in guiding the coupling between the drogue to the receiver probe to, at least partially, achieve an autonomous/assisted contact easing the maneuver from the receiver aircraft.

Moreover, the present invention may be embodied to keep a fixed reference of the hose-end thanks to the relative position of the hose-end obtained by means of a closed control loop. That is, this closed control loop obtains the relative position from the first sensing means and acts independently in the deflection angle of each grid fin to keep the required roll at the hose-end in the refueling operation.

Therefore, the present invention may be embodied to monitor the provision of loads at the hose-end according to relative position between the drogue and the receiver probe and the acceleration on the hose-end. When the system detects by means of the processing unit that there is no need to provide loads at the hose-end, the system stops this load provision by the HCU.

In a particular embodiment, the HCU comprises: a fixed frame arranged along the longitudinal axis and mechanically connecting the hose to the coupling, and a rotary frame rotationally connected to the fixed frame and comprising the plurality of fin shafts on which the grid fins are fixed, this rotary frame being configured to rotate around the longitudinal axis thus allowing the free rotation of the plurality of grid fins.

The HCU may have the functions of providing a mechanical connection between the hose and the coupling and the loads transition, and generating aerodynamic loads to stabilize the drogue. Particularly, the HCU is formed by a fixed frame and a rotary frame.

The fixed frame of the HCU may be mechanically connected to the hose and the coupling at the hose-end. This fixed frame is the link that transmits axial and torsion loads between complete assemblies at the hose-end. The link between the hose and the coupling follows a longitudinal axis. Likewise, the rotary frame of the HCU is installed over the fixed frame and rotationally connected to this fixed frame so that his rotary frame can rotates around the longitudinal axis.

The fin shafts, each supporting a respective grid fin, are attached to the rotary frame on which the grid fins are installed. When the rotary frame rotates the plurality of grid fins also rotates. The rotary frame advantageously allows that the torsion loads transmitted from the HCU to the hose be less than the maximum torsion admissible by hose qualification. Thus, the rotary frame is the support part of the HCU where all the actuation system is installed.

Furthermore, the fixed frame of the HCU may comprise mechanical interfaces which compatibilities the attachment of the HCU between the hose and the coupling.

The particular configuration of HCU comprising a fixed frame and a rotary frame allows the grid fins to be properly positioned without transmitting torsion loads to the hose.

In a particular embodiment, the rotary frame is installed over the fixed frame of the HCU by means of bearings thus allowing the free rotation of the rotary frame around the longitudinal axis.

Bearings 16 may be arranged around the fixed frame of the HCU to support the rotary frame of the HCU and to allow this rotary frame to rotate around the longitudinal axis. Specifically, these bearing transmit providing connections from the fixed frame to the rotary frame of the HCU so that it allows the rotation between both fixed and rotary frames of the HCU. This configuration of HCU allows the rotary frame rotates independently from the hose of the present system.

In a particular embodiment of the invention, there may be four grid fins and their respective fin shafts, wherein the fin shafts are separated at 90 degrees of angular separation with respect to a longitudinal axis of the rotary frame of the HCU. This particular configuration of the position of the grid fins advantageously avoids the hose shadow and therefore prevents to perturb the grid fins performances.

In a more particular embodiment, according to a plane transverse to the longitudinal direction, two of the grid fins are at 45° with respect to a vertical axis and the other two grid fins are at 45° with respect to a horizontal axis, both vertical and horizontal axes contained in the transverse plane and perpendicular to each other. The "transverse plane" will be understood as a vertical plane that is perpendicular to the longitudinal axis already defined. In this vertical plane there will be defined a vertical axis and a horizontal axis. Both vertical and horizontal axis are perpendicular between them and also perpendicular to the longitudinal direction.

In a particular embodiment, the HCU further comprises for each grid fin an actuator for providing the deflection of the grid fin with respect to their fin shaft according to the system requires. That is, these actuators are in charge to provide the movement for the defection of the grid fins adapting independently the deflection angle of each gird fin. The fact that there is one actuator for each grid fin allows, advantageously, independent control of each grid fin. In a particular embodiment, the actuators are configured to transform a lineal movement into a rotational movement for the deflection of the grid fins.

In a more particular embodiment, the actuators are electromechanical actuators.

In a particular embodiment, each fin shaft is supported by two fin shaft bearings and mechanically connected to the actuator.

In another embodiment, each actuator comprises second sensing means for sensing the deflection angle of the corresponding grid fin. These sensing means are configured to give feedback information to the processing unit or to an aircraft control equipment of the tanker aircraft in an operative mode about the deflection angle of each grid fin in real time. In a more particular embodiment, the second sensing means are a sensor installed in each fin. Depending on the sense of deflection of the grid fins, the force in the hose-end will go to one way or another according to the system requirements In a particular embodiment, the HCU further comprises a folding mechanism configured for folding or deploying the plurality of grid fins with respect to the HCU. In a more particular embodiment, the folding mechanism comprises a retraction mechanism common to the plurality of grid fins. In a particular embodiment, this retraction mechanism may comprise a solenoid through which the retraction of the plurality of grid fins is performed guiding the fins towards the HCD frame. Particularly, this retraction mechanism is common to all the grid fins, thus, the folding and deployment of the fins is perform at the same time. In another particular embodiment, the retraction mechanism is configured to fold or deploy each grid fin independently. In any of the embodiments mentioned for the retraction mechanism, this is an electromechanical actuation system.

In a more particular embodiment, the folding mechanism is independent of the deflection actuation on the grid fins. This configuration allows the system to control independently the actuation of the deployment and retraction of fins of the actuation of the deflection of each grid fin as well of the rotation of the plurality of grid fins.

Moreover, the folding mechanism ensures the capability of the fins to be folded to deal with any system failure as hose unexpected oscillations and hose extension/retraction. In this sense, when the system energized or power supply failure occurs, the system is configured to ensure the fins to be folded. In a particular embodiment, the folding mechanism is performed through a concentric mechanism connected to each fin through a lever that permits the movement of the fin. In this example, the actuation is performed through a linear actuator directly aligned to the fin shaft. In another example, the actuation is performed through a slope mechanism that permits folding the grid fins at the same time.

The present system further comprises power supplying means configured to supply power at least to the components of the system such as the HCU, the processing unit and the first sensing means. The power supplying means may be batteries or rat located on the system. Furthermore, the communication between the components of the system, such as between the HCU and the first sensing means with the processing unit is wireless.

In a second inventive aspect, the present invention provides a tanker aircraft comprising an air to air active refueling system according to the first inventive aspect.

The air to air active refueling system is arranged at the tanker aircraft so that the hose of this system is connected to the tanker aircraft at a hose-end opposite to the hose-end where the coupling with the drogue and the HCU are located. The air to air refueling system is intended to supply fuel from the tanker aircraft to a receiver aircraft by coupling the hose to a receiver probe of the receiver aircraft through the drogue of the present system.

In a particular embodiment, the tanker aircraft comprises an aircraft control equipment connected to the air to air refueling system and its components such as the HCU, the processing unit and the first sensing means. Specifically, in a particular embodiment, the aircraft control equipment is configured to determine the aerodynamic radial loads needed at the hose-end of the system based on the information from the IMU located at the HCU and the first sensing means and processed by the processing unit.

The system can be autonomous in such a way that the processing unit is in charge of controlling the operation of the system even when the system is in an operating mode installed on the tanker aircraft. In another particular embodiment, when the system is in an operative mode installed in the tanker aircraft, the operation of this system is controlled by an aircraft control equipment of the tanker aircraft. In this embodiment, the communication between the tanker aircraft and the components of the system is wireless.

The aircraft control equipment is formed at least by a controller and an human machine interface "HMI" both connected between them and also suitable to be connected to the air to air active refueling system. The HMI interacts with the present system to monitor and record the information measured by the system. In addition, the controller is responsible of running the Flight Control Laws and conditioning the data information received and sent from and to the HMI and HCU, first sensing means and processing unit of the system. The mentioned Flight Control Laws are in charge of defining the flight control laws of the air to air refueling system taken into account all the functionalities of the present system. Therefore, the air to air refueling system has an active control of the radial generated aerodynamic force at the hose-end in order to adapt it to the external perturbations.

In a third inventive aspect, the present invention provides a method for generating aerodynamic radial loads at a hose-end of an air to air active refueling system according to first inventive aspect, the method comprising the following steps: configuring the deflection angle of each grid fin located at the HCU, and rotating the plurality of fins by means of the actuation of the HCU, wherein both the configuration of the deflection angles and the rotation of the plurality of the grid fins are based on measurements processed by the processing unit of the system.

In a particular embodiment, the method further comprising measuring the acceleration of the hose-end by means of at least the IMU located at the HCU and measuring the relative position between the probe of the receiver aircraft and the drogue of the tanker aircraft by means of the first sensing means to inform the processing unit about the movement conditions of the hose-end in order to determine the aerodynamic radial loads needed at the hose-end.

All the features described in this specification (including the claims, description and drawings) and/or all the steps of the described method can be combined in any combination, with the exception of combinations of such mutually exclusive features and/or steps.

SUMMARY OF FIGURES

These and other characteristics and advantages of the invention will become clearly understood in view of the detailed description of the invention which becomes apparent from a preferred embodiment of the invention, given just as an example and not being limited thereto, with reference to the drawings.

FIG. 1 is a side view of an air to air active refueling system of a tanker aircraft approaching to a receiver aircraft according to an embodiment of the present invention.

FIG. 2 is a top-down view of the embodiment shown in FIG. 1.

DETAILED DESCRIPTION

Figure 3:
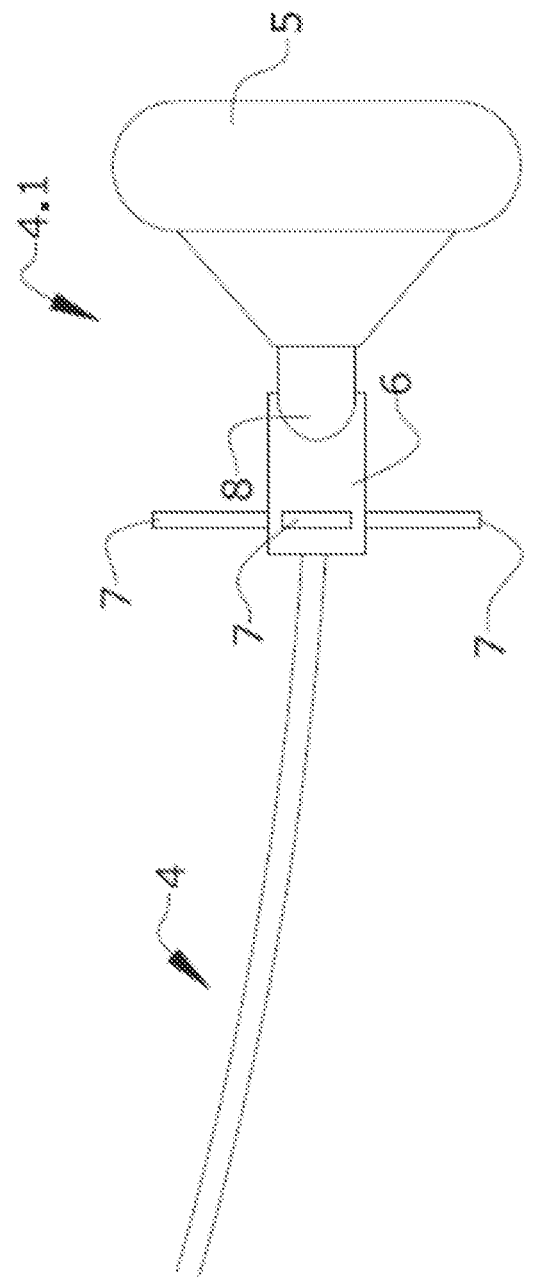
FIG. 3 is a side view of a hose of an air to air active refueling system according to an embodiment of the present invention.

FIGS. 1 and 2 show a side and an upper view respectively of an air to air active refueling system (1) in a refueling operation between a tanker aircraft (2) and a receiver aircraft (3). In particular, these figures show the hose (4) of the air to air active refueling system (1) is in an extended position out of a tanker aircraft (2) and the receiver aircraft approaching to this hose (4). The air to air active refueling system (1) comprises a hose (4) for driving fuel from a tanker aircraft (2) to a receiver aircraft (3) in a refueling operation. Said hose (4) presents a drogue (5) located at a hose-end (4.1) suitable for being coupled with a probe (13) of the receiver aircraft (3). The hose (4) also comprises another end (4.2) opposite to the already mentioned hose-end (4.1) where the hose (4) is fixed to the tanker aircraft (2). In a refueling operation, the refueling system (1) installed on the tanker aircraft (2) extends the hose (4) in order to couple the drogue (5) of the hose-end (4.1) to the probe (13) of the receiver aircraft (3) that is flying closer to the tanker aircraft (2) for allowing the approaching of the drogue (5) towards the probe (13). Once the coupling is achieved, then the fuel starts being driven through the hose (4) from the tanker aircraft (2) towards the receiver aircraft (3).

FIG. 3 shows a schematic side view of a portion of a hose (4) of an air to air active refueling system (1). The hose (4) comprising a hose-end (4.1) suitable for coupling the air to air active refueling system (1) to a probe (13) of the receiver aircraft (3) (as shown in FIGS. 1 and 2) by monitoring and generating aerodynamic radial loads at the hose-end (4.1) in order to adapt the movement at the end of the hose (4) while approaching the probe (13) of the receiver aircraft (3). The hose-end (4.1) comprises a drogue (5) and a coupling (8), the drogue (5) is arranged through the coupling (8) and is the component of the refueling system (1) that is directly coupled to a probe (13) of a receiver aircraft (3) in refueling operations, as shown in FIGS. 1 and 2.

According to FIG. 3, the hose-end (4.1) also comprises a Hose Control Unit (HCU) (6) configured to reduce aerodynamic radial loads at the end of the hose (4) due to flight conditions of the refueling system (1) in a refueling operation. The HCU (6) is located between the hose (4) and the coupling (8). Said HCU (6) shows three grid fins (7) in a deployed state. These grid fins (7) can be folded or deployed following the need of adapting the movement of the hose-end (4.1) in a refueling operation. The grid fins (7) are deployed from the HCU (6) towards outside this HCU (6).

Figure 4:
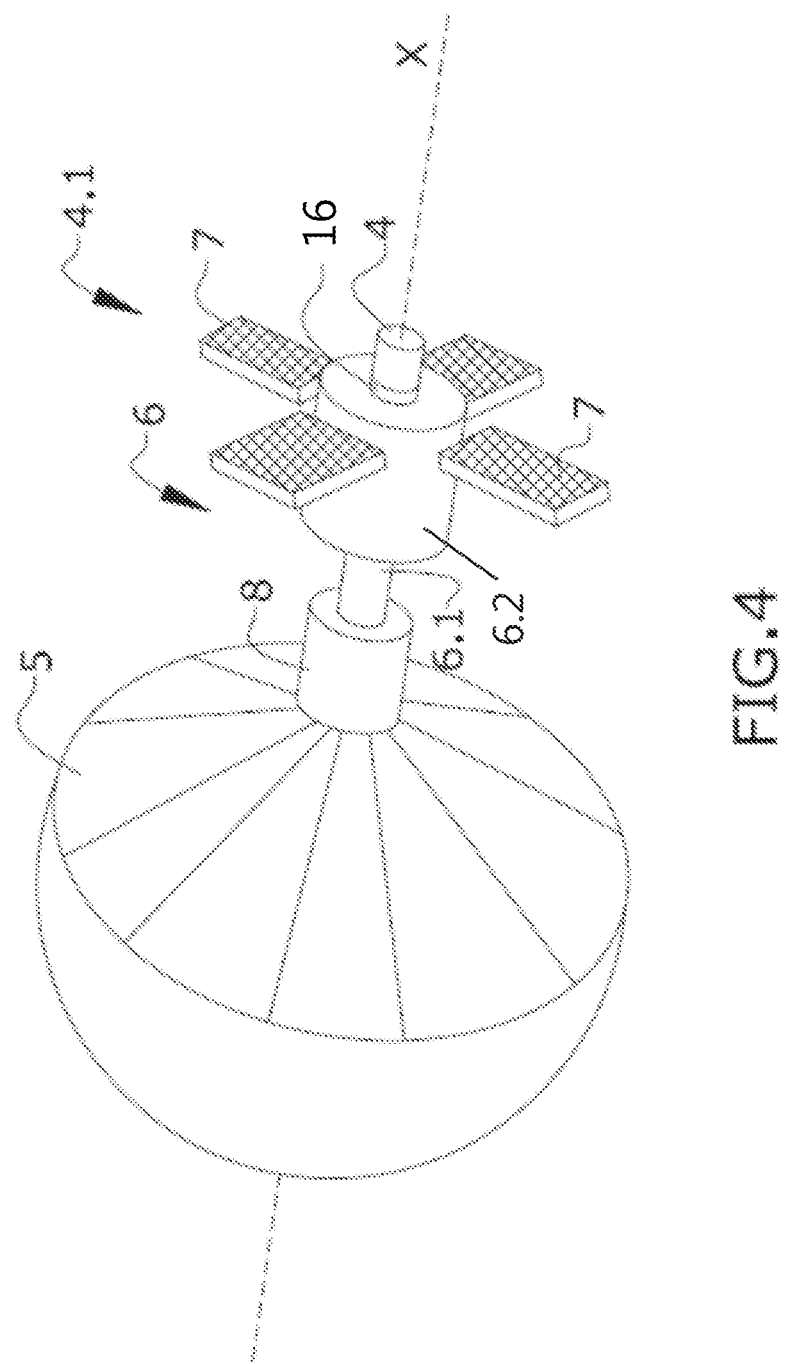
FIG. 4 is a perspective view of a hose-end of an air to air active refueling system according to an embodiment of the present invention.
Figure 5:
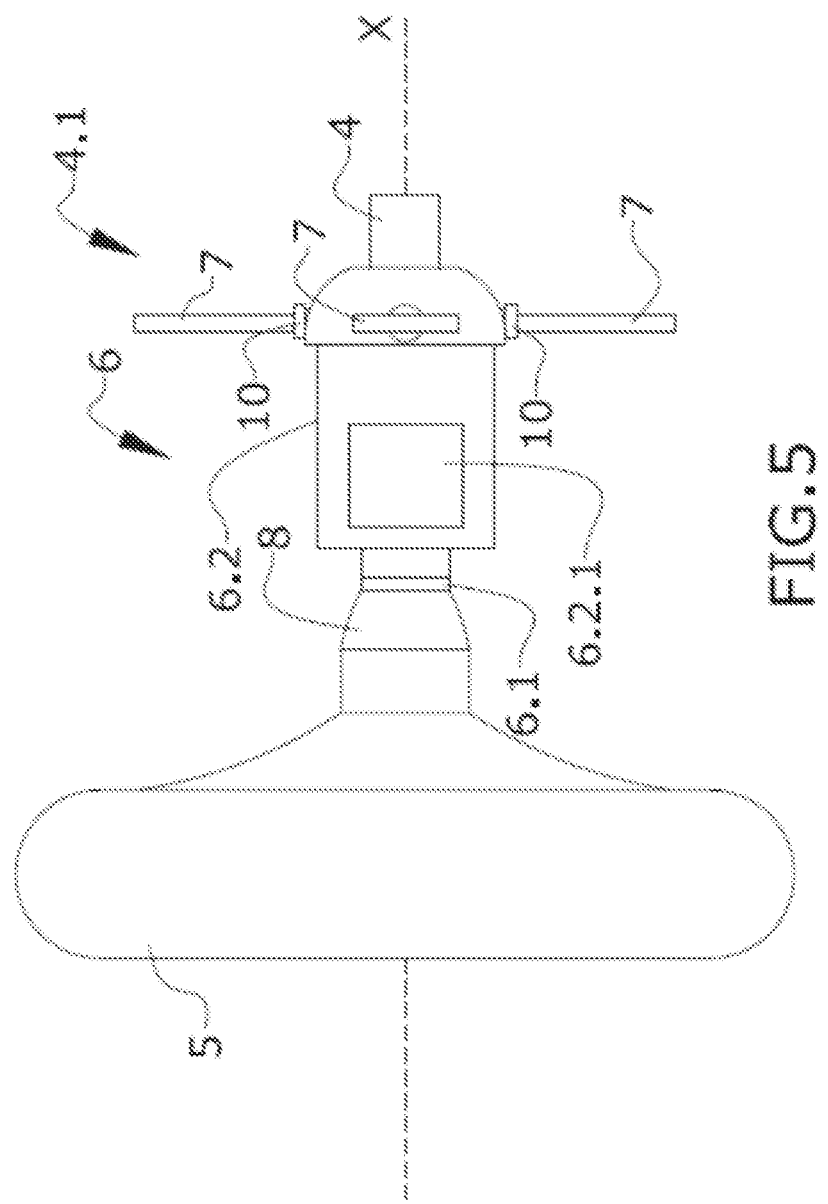
FIG. 5 is a side view of the hose-end of an air to air active refueling system according to an embodiment of the present invention.

FIGS. 4 and 5 show p examples of an air to air active refueling system (1). Particularly, FIG. 4 shows a perspective view of a hose-end (4.1) of the refueling system (1) in detail and FIG. 5 shows a side view of another hose-end (4.1) in detail of a refueling system (1).

Both refueling systems (1) of FIGS. 4 and 5 comprise a HCU (6) located at the hose-end (4.1) and comprising a fixed frame (6.1) and a rotary frame (6.2).

The fixed frame (6.1) is arranged along a longitudinal axis (X) around the hose (4) at the hose-end (4.1) and the rotatory frame (6.2) is rotationally connected to the fixed frame (6.1). Said rotary frame (6.2) is configured to rotate around the same longitudinal axis (X) and provide adaptation to in-flight conditions. In FIG. 4, the HCU (6) shows four grid fins (7) located on the rotatory frame (6.2) and in a deployed state. FIG. 5 shows a rotary frame (6.2) with three grid fins (7) in a deployed state and fin shafts (10) on which one grid fin (7) is respectively fixed on each fin shaft (10). Specifically, the rotation of the rotatory frame (6.2) around the longitudinal axis (X) allows the free rotation of the plurality of grid fins (7) given that the grid fins (7) are fixed to the rotatory frame and their respective fin shafts (10) (according to FIG. 5) are also mounted on said rotatory frame (6.2).

FIGS. 4 and 5 further shows a coupling (8) mechanically connected to the hose (4) through the fixed frame (6.1) along the longitudinal axis (X). Said coupling (8) is responsible for forwarding the hose (4) to the drogue (5) and ensure the fuel arrival at a drogue (5) also located at the hose-end (4.1) of the refueling system (1). Said drogue (5) is arranged for connecting the hose-end (4.1) to the probe (13) of a receiver aircraft (3) (shown in FIGS. 1 and 2) to confer autonomy and assistance to the receiver aircraft (3) for the approach maneuver in a refueling operation. Particularly, during the contact coupling is configured to support axial and radial loads transmitted by the receiver aircraft (3). The contact will be understood as the time in which the drogue (5) of the tanker aircraft (2) contacts with the probe (13) of the receiver aircraft (3) (after the moment shown in FIGS. 1 and 2). Therefore, during the contact in a refueling operation the HCU (6) performs an active control of the axial forces transmitted between the receiver probe (13) and the coupling (8) by generating additional drag force. This additional drag force (aerodynamic radial loads) is provided by the actuation of a deflection angle (a) (shown in FIG. 6) in each grid fin (7) independently and the rotation of these grid fins (7). Thus, these aerodynamic radial loads at the hose-end (4.1) help to keep the force balance in contact between the tanker aircraft (2) and the receiver aircraft (3), in addition to drogue tension control and coupling latching forces, in a refueling operation.

As it can be observed in FIG. 5, the rotatory frame (6.2) comprises gaps (6.2.1) which are suitable for housing the grid fins (7) inside said rotary frame (6.2) when these grid fins (7) are in a folded state.

Figure 6:
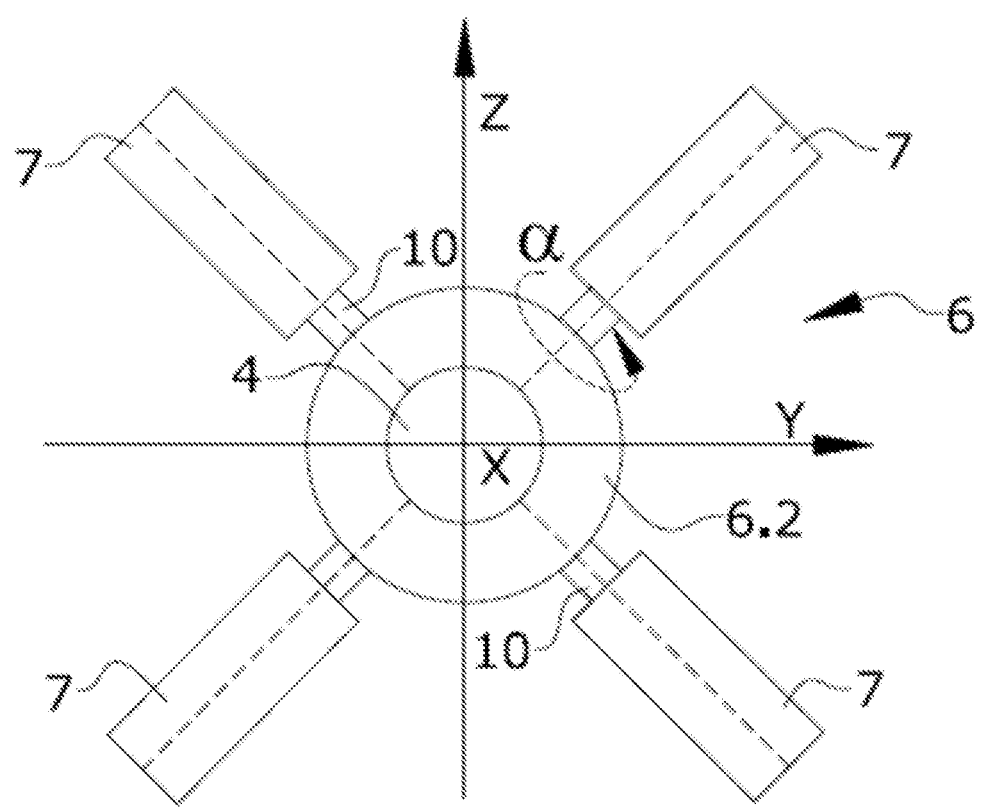
FIG. 6 is an end view of a hose control unit (HCU) having four grid fins of an air to air active refueling system according to an embodiment of the present invention.

FIG. 6 shows a schematic view of an example of a rotatory frame (6.2) of an HCU (6), this view corresponding to a cross-sectional view to longitudinal axis (X) or the hose (4) of an air to air active refueling system (1). Particularly, it is shown four grid fins (7) in a deployed state and mounted on the rotatory frame (6.2) of the HCU (6). Each grid fin (7) is respectively mechanically connected to this rotatory frame (6.2) by a fin shaft (10). In particular, the fin shafts (10) are separated by 90° from each other respecting the longitudinal axis (X).

Each grid fin (7) can be actioned by an actuator (not shown in figures) responsible for the deflection of each grid fin (7) independently of the others and with respect to their fin shaft (10) based on the processed information and required adaptation to in-flight conditions. The fin shaft (10) provides to each grid fin (7) the independent rotation that facilitate the adaptation of the desired aerodynamic radial loads at the hose-end (4.1) and ensure the connection of the drogue (5) with the probe (13) of the receiver aircraft (3) in a refueling operation. Particularly, the independent rotation of each grid fin (7) corresponds to adapting the deflection angle (a) of these grid fins (7).

Figure 7:
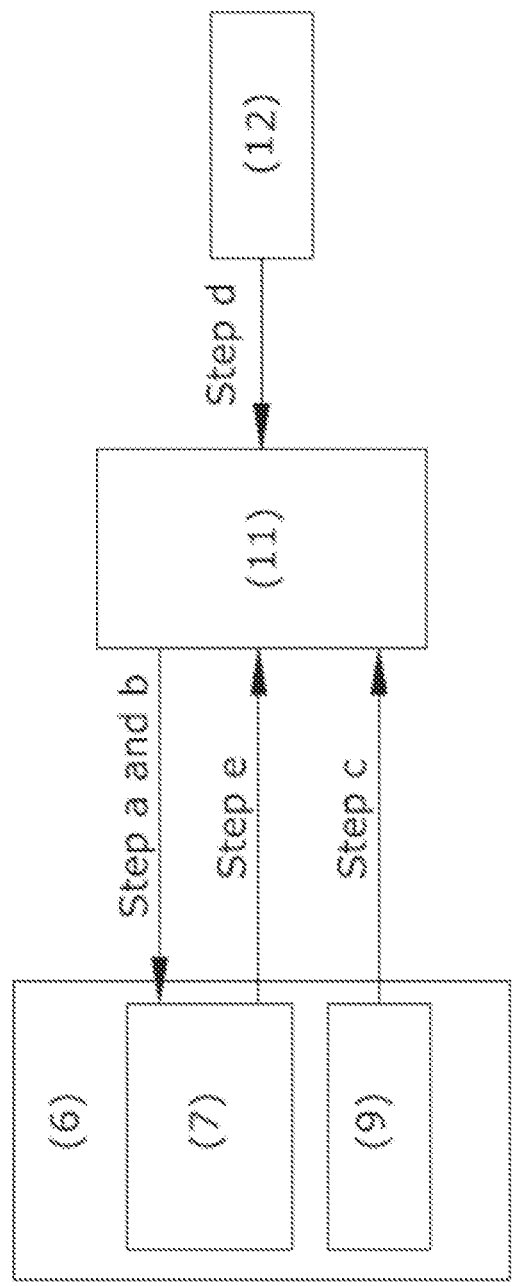
FIG. 7 is a schematic diagram of components of an air to air active refueling system according to an embodiment of the present invention.

FIG. 7 shows an architecture model of some of the components that collaborate in the provision of aerodynamic radial load at the hose-end (4.1) of an air to air active refueling system (1). This refueling system (1) comprises at least an HCU (6) comprising a plurality of grid fins (7) for generating radial loads at the hose-end (4.1) by deploying the plurality of grid fins (7) and actuating on their deflection angle (a) and their rotation around a longitudinal axis (X) to adapt to the in-flight conditions. The HCU (6) further comprises and IMU (9) for measuring the acceleration at the hose-end (4.1). The refueling system (1) also comprises first sensing means (12) that can be located on the hose-end (4.1) or on the tanker aircraft (2) when the refueling system (1) in operative mode is installed on said tanker aircraft (2). The first sensing means (12) measures the relative position between the hose-end (4.1) and a receiver aircraft (3) or between the tanker aircraft (2) and the receiver aircraft (3) respectively. Additionally, the refueling system (1) comprises a processing unit (11) in data connection with the HCU (6) and the first sensing means (12). This processing unit (11) processes the measurements from the IMU (9) and the first sensing means (12), and according to the processed information about the measurements, the processing unit (11) is configured send comments, e.g., data, to the HCU (6) to enable the HCU to generate the aerodynamic radial loads predefined according to the refueling system (1) needed in a refueling operation. The processing unit (11) can be located on the hose-end (4.1) or on a tanker aircraft (2) when the refueling system (1), in an operative mode, is installed on the tanker aircraft (2).

The invention may be embodied as a method for generating aerodynamic radial loads at a hose-end (4.1) (shown in FIGS. 1-6) of an air to air active refueling system (1) and comprises at least the following steps: a) configuring the deflection angle (a) of each grid fin (7) located at the HCU (6), and b) rotating the plurality of fins (7) by means of the actuation of the HCU (6), wherein both the configuration of the deflection angles (a) and the rotation of the plurality of the grid fins (7) are based on measurements processed by the processing unit (11) of the system (1).

In a refueling operation, the IMU (9) located on the HCU (6) measures a linear acceleration and angular acceleration at one point of the hose-end (4.1) and send (step c) these measurements to the processing unit (11). In addition, the first sensing means (12) located, for example, on the hose-end (4.1) measure the relative position between the probe (13) of a receiver aircraft (3) and the location of the first sensing means (12) on the hose-end (4.1) of the tanker aircraft (2), and this relative position measurement is also sent (step d) to the processing unit (11). Both steps c) and d) are carried out before the mentioned steps a) and b).

Once the processing unit (11) received information at least from the IMU (9) and the first sensing means (12), the processing unit (11) processes this information and is able to determine the aerodynamic radial loads needed at the hose-end (4.1). Therefore, according to this predetermined needed, the processing unit (11) commands the HCU (6) to actuate, according to step a), the deflection angle (a) of each grid fin (7) and, according to step b), the rotation of all the grid fins (7) by means of the rotation of the rotatory frame (6.2) of this HCU (6). The processing unit (11) is further able to process the information coming from the IMU (9) and first sensing means (12) and to determine the deflection angle (a) configuration for each grid fin (7) and the velocity of rotation of the rotary frame (6.2) of the HCU (6) for generating the aerodynamic radial load needed at the hose-end (4.1) in the approach to the coupling between the drogue (5) of the tanker aircraft (2) and the probe (13) of the receiver aircraft (3).

The processing unit (11) is also able to provide folding/deploying actuation of said plurality of grid fins (7) by means of a folding mechanism (not shown in figures) located on the HCU (6). The deploying actuation is performed prior to configure the deflection angle (a) of each grid fin (7) and also prior to rotate these grid fins (7). However, the folding actuation is performed after the generation of aerodynamic radial loads by the actuation of the HCU (6).

Moreover, the processing unit (11) can be connected to an aircraft control equipment, such as a controller located on the aircraft, so that this control equipment determines the aerodynamic radial loads needed at the hose-end (4.1) instead of the processing unit (11) and sends to the HCU (6) instructions to configure the deflection angle (a) of each grid fin (7) and to rotate these grid fins (7)).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A method for compensating for aerodynamic radial loads applied to a drogue coupling of a hose and drogue air to air active refueling system of a tanker aircraft, the method comprising:
    deploying a refueling hose from a tanker aircraft, wherein the drogue coupling is at a distal end of the hose and the drogue coupling is connected to a hose end control unit which includes at least three fins extending outward into air flowing over the hose end control unit;
    after the drogue coupling is coupled to a receiver aircraft for transferring fuel from the tanker aircraft to the receiver aircraft:
        sensing acceleration of the hose end control unit and/or the drogue coupling, generating an acceleration signal with data representing the sensed acceleration;
        determining, based on the acceleration signal, at least one deflection angle for at least one of the three fins to reduce an aerodynamic load applied to the drogue coupling and/or the hose end control unit, and
        rotating at least one of the three fins by the at least one deflection angle, wherein the rotation reduces the aerodynamic load applied to the drogue coupling and/or the hose end control unit.

2. The method of claim 1, further comprising determining, based on the acceleration signal, the aerodynamic radial force applied to the hose end control unit and/or the drogue coupling,
    wherein the step of rotating the at least one of the three fins reduces the radial aerodynamic load.

3. The method of claim 1, wherein the rotating of the at least one of the three fins is performed by the hose end control unit.

4. The method according to claim 1, wherein the steps of sensing of the acceleration, generating the acceleration signal, determining the at least one deflection angle and the rotation of the at least one of three fins are performed by at least one processing unit that performs the steps in real time and repeatedly.

5. The method according to claim 1, wherein the step of determining the at least one deflection angle includes determining a deflection angle to counteract the sensed acceleration.

6. The method according to claim 1, wherein the step of determining the at least one deflection angle includes determining the deflection angle to reduce the sensed acceleration.

7. The method according to claim 1, further comprising:
    determining a radial load on the hose control end unit and/or the drogue coupling due to the acceleration, and
    the determining of the at least one deflection angle includes determining the deflection angle to reduce the radial load.

8. A method for air-to-air refueling comprising:
    deploying a refueling hose from a tanker aircraft, wherein the refueling hose includes at distal portion including a hose end and hose control unit, and the hose control unit includes a moveable aerodynamic surface extending into an airflow over the hose control unit;
    after the distal portion is coupled to a receiver aircraft for transferring fuel from the tanker aircraft to the receiver aircraft:
        sensing an acceleration associated with the distal portion;
        determining an aerodynamic force applied to the distal portion based on the sensed acceleration,
        determining a movement to be applied to the aerodynamic surface to reduce the aerodynamic force,
        moving the aerodynamic surfaces in accordance with the determined movement, and
        reducing the aerodynamic force applied to the distal portion by the moving of the aerodynamic surfaces.

9. The method for air-to-air refueling of claim 8, further comprising connecting the hose end to a receiver probe of a receiver aircraft before the reducing the aerodynamic force by moving the aerodynamic surfaces.

10. The method for air-to-air refueling of claim 9, wherein the aerodynamic surface includes a rotatable fin extending outward from the hose control unit, and the movement is a rotation of the fin.

11. The method for air-to-air refueling according to claim 8, wherein the steps of sensing of the acceleration, determining the aerodynamic force, determining the movement, and the moving the aerodynamic surface are performed by at least one processing unit that performs the steps in real time and repeatedly.

12. The method for air-to-air refueling according to claim 8, wherein the step of determining the movement includes determining the movement to counteract the sensed acceleration.

13. The method for air-to-air refueling according to claim 8, wherein the determination of the aerodynamic force is a determination of a radial aerodynamic force applied to the hose end and/or hose end control unit due to the sensed acceleration, and the determining of the movement includes determining the movement to reduce the radial aerodynamic force.

14. A method for air-to-air refueling comprising:

deploying a refueling hose from a tanker aircraft, wherein the refueling hose includes at distal portion including a hose end and hose control unit, and the hose control unit includes a moveable aerodynamic surface extending into an airflow over the hose control unit;

after the distal portion is coupled to a receiver aircraft for transferring fuel from the tanker aircraft to the receiver aircraft:

sensing a radial aerodynamic force applied radially to the distal portion of the deployed refueling hose;

determining a movement for the aerodynamic surface to reduce the radial aerodynamic force;

moving the aerodynamic surface relative to the airflow to achieve the determined movement;

reducing the radial aerodynamic force applied radially to the distal portion by the moving of the aerodynamic surface;

connecting the hose end to a receiver probe of a receiver aircraft, and delivering fuel to the receiver aircraft from the refueling hose, through the hose end and into the receiver probe.

15. The method for air-to-air refueling of claim 14, wherein the aerodynamic surface is a rotatable fin extending outward from the hose control unit, and the movement is a rotation of the fin.

16. The method for air-to-air refueling according to claim 14, wherein the steps of sensing of the acceleration, determining the movement, and the moving the aerodynamic surface are performed by at least one processing unit that performs the steps in real time and repeatedly.

17. The method for air-to-air refueling according to claim 14, wherein the step of determining the movement includes determining the movement to counteract the radial aerodynamic force.

* * * * *